Figure 1:
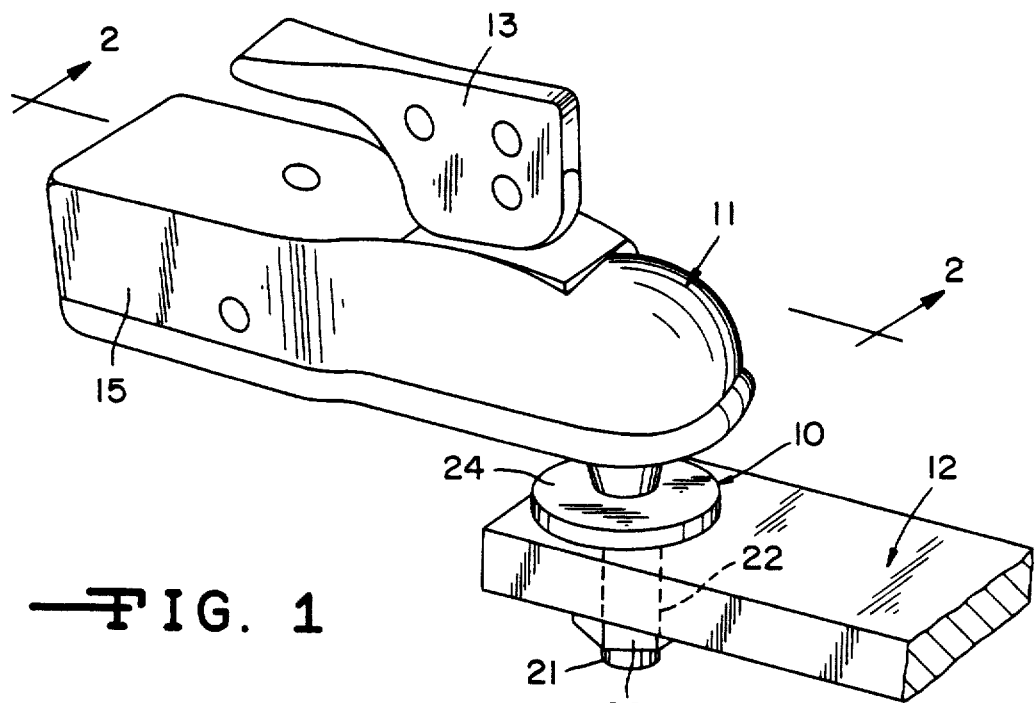

United States Patent [19]

Putnam

[11] Patent Number: 4,993,739
[45] Date of Patent: Feb. 19, 1991

[54] HITCH BALL

[76] Inventor: Rex D. Putnam, P.O. Box 39, 211 Industrial Ave., Bronson, Mich. 49028

[21] Appl. No.: 392,832

[22] Filed: Aug. 11, 1989

[51] Int. Cl.⁵ .............................................. B60D 1/06
[52] U.S. Cl. .................................. 280/511; 384/212; 403/125; 403/135
[58] Field of Search .............. 280/504, 507, 511, 512, 280/513; 403/3, 122, 125, 126, 127, 135, 142; 411/396, 383; 384/212, 281

[56] References Cited

U.S. PATENT DOCUMENTS

| | | |
|---|---|---|
| 3,307,857 | 6/1966 | Robertson ........................ 280/511 |
| 3,376,051 | 4/1968 | Bacher ............................ 280/512 |
| 3,630,546 | 12/1971 | Church ........................... 280/511 |
| 3,968,981 | 7/1976 | Suarez ............................ 280/511 |
| 4,072,320 | 2/1978 | Powell ......................... 280/416.1 |
| 4,186,940 | 2/1980 | Pillars ............................ 280/507 |
| 4,319,766 | 3/1982 | Corteg ........................... 280/511 |
| 4,433,854 | 2/1984 | Smith ............................. 280/511 |
| 4,577,988 | 3/1986 | Gollub et al. ................... 403/135 |
| 4,772,039 | 9/1988 | Cook .............................. 280/511 |

FOREIGN PATENT DOCUMENTS

| | | | |
|---|---|---|---|
| 3149628 | 7/1985 | Fed. Rep. of Germany ...... 403/122 |
| 3618298 | 12/1987 | Fed. Rep. of Germany ...... 403/122 |
| 1372120 | 2/1988 | U.S.S.R. ............................ 403/122 |
| 0916291 | 1/1963 | United Kingdom ............... 403/122 |

Primary Examiner—David M. Mitchell
Assistant Examiner—Mitchell Bompey
Attorney, Agent, or Firm—Ian C. McLeod

[57] ABSTRACT

A hitch ball (20) with a mating first set of shells (25a and 25b) and optionally a second set of shells (27a and 27b) to increase the diameter of the ball to accommodate various sized hitch assemblies (11) are described. In a preferred form detents (25e and 25f) in the first set of shells are provided in a recess (23) in the ball. Detents (27c and 27d) are provided on the detents (25e and 25f) of the first set of shells. The invention provides safe and effective mounting of the sets of shells on the hitch ball and prevents the shells being used on a conventional hitch ball which might not be rated for the increased capacity provided by the larger ball size.

17 Claims, 3 Drawing Sheets

HITCH BALL

BACKGROUND OF THE INVENTION (1) Field of the Invention

The present invention relates to an improved hitch ball with one or more sets of removable, mating hemispherical shells which increase the diameter of the ball to accommodate various sizes of hitch assembly. In particular, the present invention relates to a hitch ball with removable shells mounted around and covering the ball and with detents in the shell which engage a recess in the ball.

(2) Prior Art

The prior art has shown various types of hitch balls, some of which can accommodate to various size balls. Illustrative are U.S. Pat. Nos. 3,307,857 to Robertson; 3,630,546 to Church; 3,968,981 to Suarez; 4,433,854 to Smith and 4,772,039 to Cook. U.S. Pat. Nos. 3,376,051 to Bacher; 4,072,320 to Powell; 4,186,940 to Pillars and 4,319,766 to Corteg et al show various types of hitch and ball assemblies.

The patent to Suarez shows an adaptor which fits over a hitch ball. The problem is that this assembly allows the user to mount the adaptor on any size ball creating a serious safety hazard if the increased size allows the ball to be overloaded. The adaptor can be bent and damaged by the hitch and may not properly mate with the hitch because of the spaces between the arms of the adaptor. Further, it is not possible to use two sets of the adaptors together.

OBJECTS

It is therefore an object of the present invention to provide a hitch ball assembly which can be used with various sized hitches without any risk that the assembly might be damaged by the hitch assembly and which mate securely with the ball without risk of using the wrong size ball. In addition, the hitch ball is uniquely designed to accept half shells at the required load rating for all three standard ball sizes. Thus, the half shells may not be used on a conventional hitch ball which might be overloaded were it to accept the increased ball size adaptors. Further it is an object of the present invention to provide a hitch ball assembly which is economical to manufacture and is safe and simple to use. Finally, another object of the present invention is to provide half shells made from nylon or a similar product which has the added function of providing lubrication between the ball and coupler. These and other objects will become increasingly apparent by reference to the following description and the drawings.

IN THE DRAWINGS

FIG. 1 is a front perspective view of a preferred ball assembly 10 of the present invention mounted on a tongue 12 and supporting a trailer hitch assembly 11.

Figure 2:
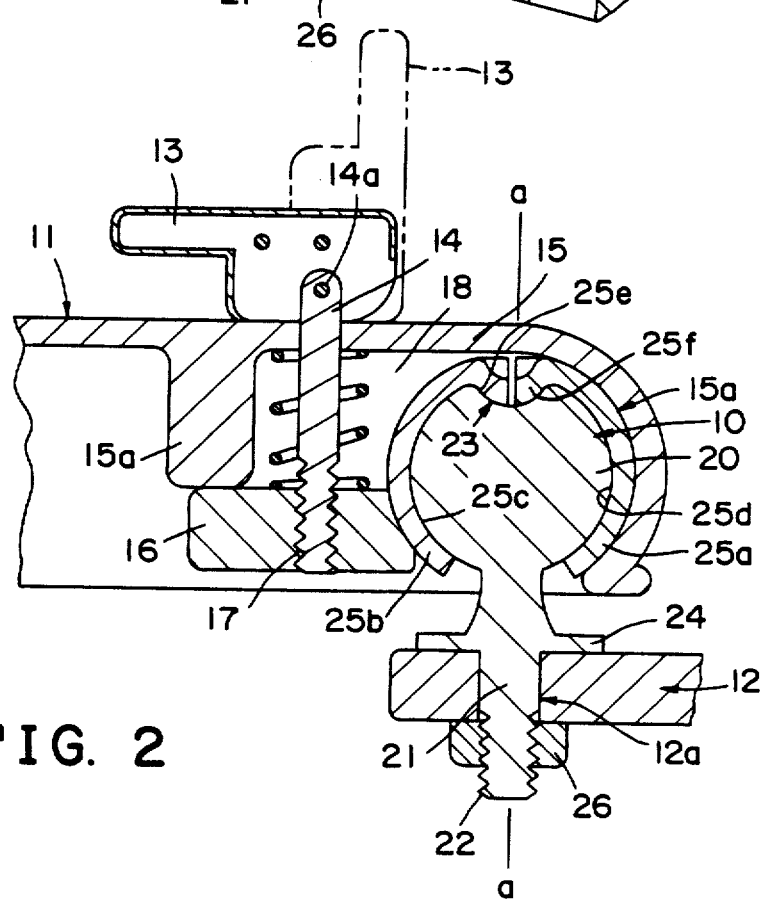

FIG. 2 is a front cross-sectional view along line 2—2 of FIG. 1 showing the ball assembly 10 with hemispherical shells 25a and 25b mounted on ball 20 to increase the diameter of the ball assembly 10 perpendicular to the axis a—a to accommodate to the hitch assembly 11.

Figure 3:
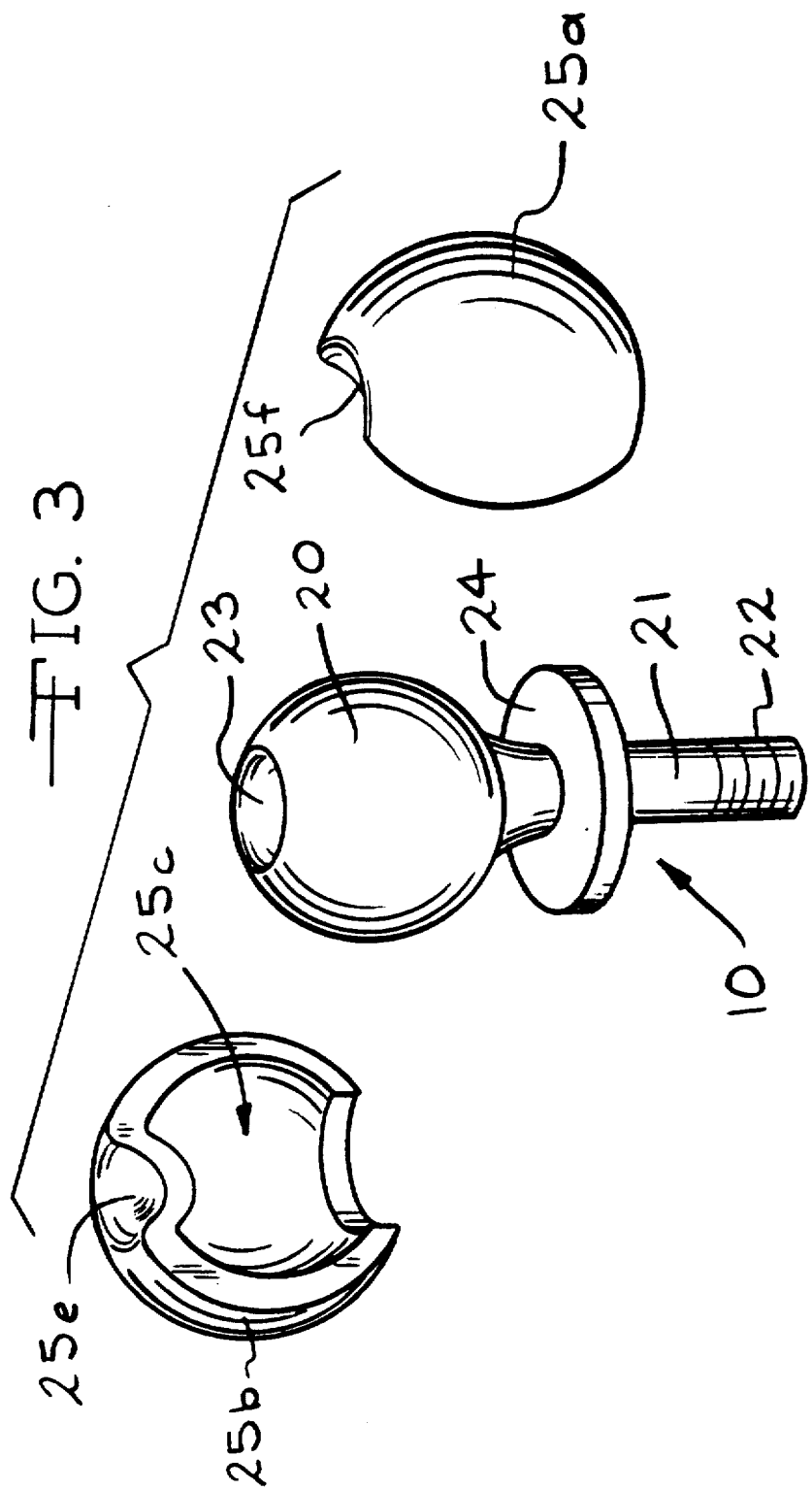

FIG. 3 is a separated front perspective view of the ball assembly 10 showing the ball 20 with the shells 25a and 25b positioned for mounting on the ball 20.

Figure 4:
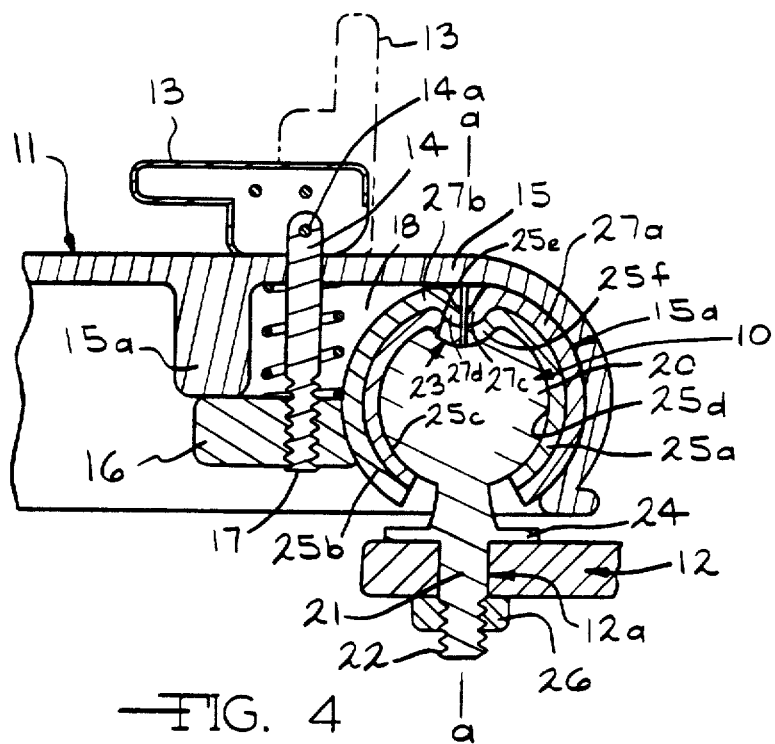

FIG. 4 is a front cross-sectional view of the ball assembly 10 of FIGS. 1 to 3 with sets of shells 25a and 25b and in addition overlapping shells 27a and 27b mounted on the shells 25a and 25b.

Figure 5:
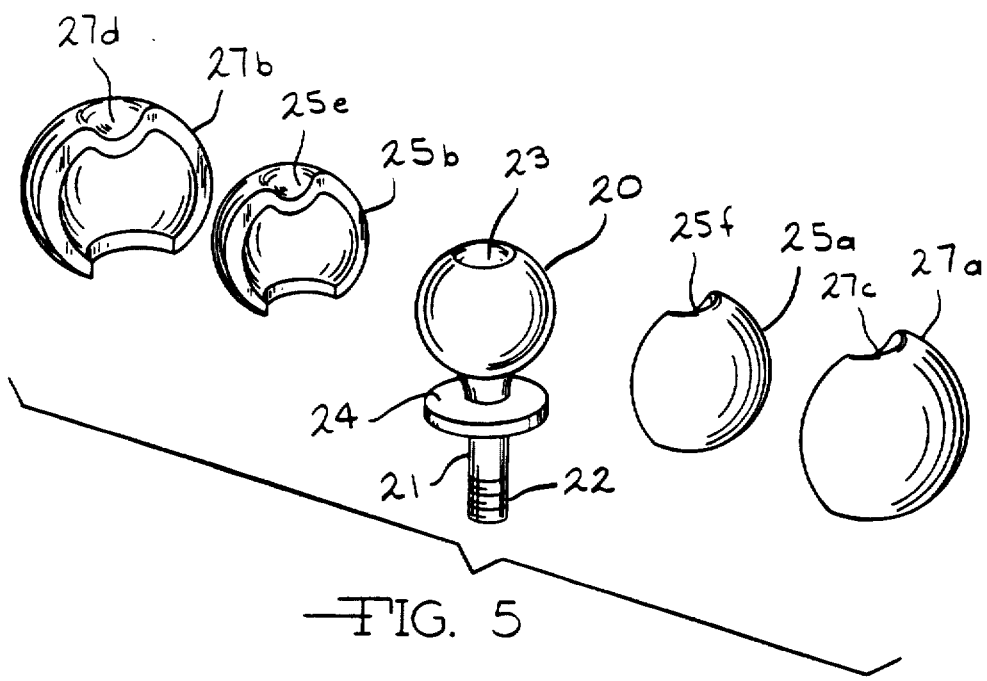

FIG. 5 is a separated view of the ball assembly 10 of FIGS. 1 to 3 with the shells 25a, 25b and in addition with shells 27a and 27b to be mounted on ball 20.

GENERAL DESCRIPTION

The present invention relates to an improved ball for a tow bar assembly mounted on a vehicle which comprises: a spherical ball with a shank extending from an axis of the ball for mounting on a tongue of the tow bar assembly; and opposed hemispherical half shells mounted around and specially mating with the ball, wherein the shells provide an enlarged standard diameter for the spherical ball which fits into a trailer hitch assembly. Preferably at least one of the shells has a detent which mates with a recess in the ball.

The present invention particularly relates to an improved ball for a tow bar assembly mounted on a vehicle which comprises a spherical ball with a shank extending from an axis of the ball for mounting on a tongue of the tow bar assembly and with a recess in the ball opposite the shank and with opposed hemispherical half shells mounted around and mating with the ball with the shells meeting along the axis and with a detent on each shell which mates with the recess in the ball; wherein the shells provide an enlarged standard diameter for the spherical ball which fits into a trailer hitch assembly. Preferably the shells meet in a plane through the axis of the ball.

The present invention also relates to an improvement in a trailer hitch assembly and tow bar assembly which comprises: an improved ball for a tow bar mounted on a vehicle which comprises a spherical ball with a shank extending from the axis of the ball for mounting in a tongue of the tow bar and with a recess in the ball opposite the shank and opposed hemispherical half shells mounted around and mating with the ball with the shells meeting along the axis and with a detent on each shell which mates with the recess in the ball, wherein the shells provide an enlarged standard diameter for the spherical ball which fits into a trailer hitch assembly. Preferably there are at least two sets of shells.

The hemispherical shells provide a means for increasing the diameter of the basic ball perpendicular to the axis a—a (FIG. 2) of the ball. This obviates the need to change hitch balls when hitches having a different opening are used.

The preferred recess in the ball and detent in each of the mating shells prevent the shells from being used on the wrong hitch ball and thus increase safety. Thus, the shells can not be fitted to a prior art hitch ball. The detents can fix the shells on the ball or they can allow the shells to move around the ball in use, which is preferred. Various means can be used to prevent the shells from being mated with standard sized hitch balls; however, the detents are preferred.

The detents and recess preferably allow free rotational movement of the shells around the axis a—a as the hitch moves to prevent damage to the shells. This prevents wear on the shells by the hitch assembly. The preferred detents are semi-circular; however, they can have any symmetrical configuration around axis a—a.

SPECIFIC DESCRIPTION

FIGS. 1 to 3 show the improved ball assembly 10 mounting a prior art trailer hitch assembly 11 and mounted on tongue 12 of a tow bar assembly (not shown). As shown particularly in FIG. 2, the hitch assembly 11 is conventional and includes a lever 13 which pivots on rod 14 at pin 14a and housing 15. The rod 14 supports cam plate 16 by means of threads 17. The lever 13 is rotated on threads 17 to loosen and tighten the cam plate 16. The cam plate 16 engages the ball assembly 10 and stop member 15a of housing 15 when lever 13 is moved from the dotted line position of FIG. 2 to the solid line position to secure the ball assembly 10 in place in recess 18 inside of the housing 15. The tongue 12 is attached to a vehicle (not shown) and has a hole 12a for mounting the ball assembly 10.

The ball assembly 10 includes a spherical ball 20 with a shank 21 having threads 22 which depends from the ball 20. At an opposite end of the ball 20 from the shank 21 along axis a—a, a recess 23 is provided which is preferably semi-circular in cross-section. A flange 24 which engages the tongue 12 is provided between the ball 20 and threads 22 and is integral with the shank 21. As shown in FIG. 2, generally the ball 20, shank 21 and flange 24 are integrally formed such as by forging. The recess 23 can also be forged into the ball 20; however, it is less expensive to mill the recess into the ball 20 to make certain it is smooth. Shells 25a and 25b are mirror images of each other and mate with the ball 20 on an interior surfaces 25c and 25d. The shells 25a and 25b each have detents 25e and 25f which control the positioning of the shells 25a and 25b on the ball 20. A nut 26 on shank 21 secures the shank 21 to the tongue assembly 12. The shells 25a and 25b and detents 25e and 25f are free to rotate around axis a—a on ball 20.

FIGS. 4 and 5 show a second set of shells 27a and 27b mounted over the shells 25a and 25b which are mounted on the ball 20. The shells 27a and 27b can be used without the shells 25a and 25b and have a thickness which includes the thickness of the shells 25a and 25b. The union along line a—a between the shells 25a and 25b is preferably offset by 90° to the union between the shells 27a and 27b. The shells 25a, 25b, 27a and 27b can be made of metal, nylon, composite or similar material so long as they function properly without undue wear.

In use of the ball assembly 10, the shells 25a and 25b (and optimally shells 27a and 27b) are mounted on the ball 20 with the detents 25e and 25f in recess 23 when using shells 27a and 27b, the detents 27c and 27d are in detents 25e and 25f. The hitch assembly 11 is then mounted over the shells 25a and 25b (or shells 27a and 27b) with the lever 13 in a vertical position (dotted lines in FIG. 2). The lever 13 is then rotated to move the cam plate 16 into position and then moved to a horizontal position, as shown in FIGS. 2 or 4, to force the plate 16 against the shell 25b or 27b with the mating inside 15a of the housing 15 against the shell 25a or 27a. Typically the shells 25a and 25b increase the outside diameter of the ball 20 to 2 5/16" (5.87 cm) or with shells 25a, 25b, 27a and 27b to 2" (5.08 cm) which are standard hitch assembly 11 sizes; however, any size which fits the hitch assembly 11 can be used. The shells 25a, 25b, 27a and 27b are designed so that they cannot be used on conventional prior art balls to prevent use with the wrong size hitch assembly. The ball 20 can be a standard size.

It is intended that the foregoing description be only illustrative of the present invention and that the present invention be limited only by the hereinafter appended claims.

I claim:

1. An improved ball for a tow bar assembly mounted on a vehicle which comprises:

(a) a spherical ball with a shank extending from an axis of the ball for mounting on a tongue of the tow bar assembly; and (b) opposed hemispherical half shells mounted on and mating with the ball so as to encase the ball, means on the shell to hold the half-shells on the ball wherein the shells can move around the axis of the ball and wherein the shells provide an enlarged standard diameter for the spherical ball which fits into a trailer hitch assembly and wherein the shells are secured in place on the ball by the hitch assembly.

2. An improved ball for a tow bar assembly mounted on a vehicle which comprises:

(a) a spherical ball with a shank extending from an axis of the ball for mounting on a tongue of the tow bar assembly and with a recess in the ball; and (b) opposed hemispherical half shells mounted on and mating with the ball so as to encase the ball, means on the shell to hold the half-shells on the ball wherein the shells can move around the axis of the ball with the shells meeting along a plane intersecting, the axis and with a detent on at least one shell which mates with the recess in the ball, wherein the shells provide an enlarged standard diameter for the spherical ball which fits into a trailer hitch assembly and wherein the shells are secured in place on the ball by the hitch assembly.

3. An improved ball assembly for a tow bar assembly mounted on a vehicle which comprises:

(a) a spherical ball with a shank extending from an axis of the ball for mounting on a tongue of the tow bar assembly and with a recess in the ball opposite the shank around the axis; and (b) opposed hemispherical half shells mounted on and mating with the ball so as to encase the ball, with the shells meeting along a plane intersecting the axis and with a detent on each shell which mates with the recess in the ball so that movement of the shells around the axis of the ball is not restricted, the shells being held on the ball by the detents mounted in the recess wherein the shells provide an enlarged standard diameter for the spherical ball which fits into a trailer hitch assembly and wherein the shells are secured in place on the ball by the hitch assembly.

4. The ball assembly of claim 3 wherein the recess in the ball and the detents on the shells are semicircular in a cross-section through the plane intersecting the axis and where the detents on each shell mate with each other and with the recess in the ball.

5. The ball assembly of claim 3 wherein there are two sets of shells, one set of shells for providing a first cross-sectional diameter and the other set for providing a second larger cross-sectional diameter by being mounted around and mating with the spherical ball or with the one set of shells.

6. The ball assembly of claim 5 wherein the recess in the ball and the detents in the shells are semicircular in cross-section through a plane intersecting the axis and where the detents on each shell mate with each other with the recess in the ball.

7. In a trailer hitch assembly and tow bar assembly the improvement which comprises:

(a) a spherical ball with a shank extending from an axis of the ball for mounting in a tongue of the tow bar and with a recess in the ball opposite the shank around the axis; and (b) opposed hemispherical half shells mounted on and mating with the ball so as to encase the ball with the shells meeting along a plane intersecting the axis and with a detent on each shell which mates with the recess in the ball so that movement of the shells around the axis of the ball is not restricted, the shells being held on the ball by the detents mounted in the recess wherein the shells provide an enlarged standard diameter for the spherical ball which fits into a trailer hitch assembly and wherein the shells are secured in place on the ball by the hitch assembly.

8. The assembly of claim 7 wherein the recess in the ball and the detents on the shells are semi-circular in cross-section where the detents mate.

9. The assembly of claim 7 wherein there are two sets of shells, one set of shells for a first cross-sectional diameter and the other set for a second larger cross-sectional diameter which can include the one set of shells.

10. The assembly of claim 9 wherein the recess in the ball and the detents in the shells are semicircular in cross-section through a plane intersecting the axis where the detents mate with each other and the recess in the ball.

11. The assembly of claim 7 wherein the trailer hitch has a cam plate and a housing which grip the shells to hold the shells on the ball.

12. A pair of shells for use on a spherical ball with a shank extending along an axis of the ball for a tow bar which comprises:

opposed hemispherical half shells which mount on and mate with the ball so as to encase the ball with the shells meeting along a plane intersecting the axis of the ball and with a detent on each shell which mates with a recess in the ball opposite the shank, wherein the recess is around the axis of the ball so that movement of the shells around the axis of the ball is not restricted, the shells being held on the ball by the detents mounted in the recess wherein the shells provide an enlarged diameter for the spherical ball which fits into a trailer hitch assembly and wherein the shells are secured in place on the ball by the hitch assembly.

13. The shells of claim 12 wherein the recess in the ball and the detents on the shells are semicircular in a cross-section through the plane intersecting the axis where the detents mate with the recess in the ball.

14. The shells of claim 12 where there are two sets of shells, one set of shells for providing a first cross-sectional diameter and the other set of shells for providing a second larger cross-sectional diameter by being mounted around and mating with the spherical ball or with the one set of shells.

15. The shells of claim 14 wherein the recess in the ball and the detents in the shells are semicircular in cross-section through the plane intersecting the axis where the detents mate with each other and with the recess in the ball.

16. The shells of claim 12 which mate with a standard sized ball.

17. A pair of shells for use on a spherical ball with a shank extending along an axis of the ball for a tow bar which comprises:

opposed hemispherical half shells which mount on and mate with the ball so as to encase the ball with the shells meeting and with a detent on at least one shell which mates with a recess in the ball, means on the shell to hold the half-shells on the ball wherein the shells can move around the axis of the ball and wherein the shells provide an enlarged diameter for the spherical ball which fits into a trailer hitch assembly and wherein the shells are secured in place on the ball by the hitch assembly.

* * * * *